United States Patent
King

(10) Patent No.: US 6,766,142 B2
(45) Date of Patent: Jul. 20, 2004

(54) SYSTEM AND METHOD FOR ADAPTIVE EQUALIZATION IN A WIRELESS COMMUNICATION SYSTEM

(75) Inventor: Jay S. King, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 327 days.

(21) Appl. No.: 09/767,443

(22) Filed: Jan. 23, 2001

(65) Prior Publication Data

US 2002/0098805 A1 Jul. 25, 2002

(51) Int. Cl.$^7$ .................................................. H04B 1/00
(52) U.S. Cl. ....................... 455/63.1; 455/135; 455/222
(58) Field of Search ............................ 455/522, 63, 39, 455/135, 67.13, 307, 213, 266, 340, 63.1, 222, 501, 570, 114.2, 283

(56) References Cited

U.S. PATENT DOCUMENTS

| | | | |
|---|---|---|---|
| 4,721,923 A | * 1/1988 | Bares et al. | ................. 330/284 |
| 4,761,829 A | 8/1988 | Lynk et al. | |
| 4,868,881 A | 9/1989 | Zwicker et al. | |
| 5,581,621 A | 12/1996 | Koyama et al. | |
| 5,835,607 A | * 11/1998 | Martin et al. | ............... 381/94.1 |
| 6,011,853 A | * 1/2000 | Koski et al. | ................. 381/56 |
| 6,018,647 A | * 1/2000 | Fitzgerald | .................... 455/135 |
| 6,160,999 A | * 12/2000 | Chheda et al. | ................ 455/69 |
| 6,173,188 B1 | * 1/2001 | Kim | ........................... 455/522 |

FOREIGN PATENT DOCUMENTS

| EP | 0767570 | 4/1997 |
|---|---|---|
| EP | 0998166 | 5/2000 |

* cited by examiner

*Primary Examiner*—Sonny Trinh
(74) *Attorney, Agent, or Firm*—Philip R Wadsworth; Charles D. Brown; Kevin T. Cheatham

(57) ABSTRACT

A wireless communication device receives audio data from a base station via a radio frequency (RF) communication link (i.e., a forward link) and transmits audio data to the base station via the RF communication link (i.e., a reverse link). The wireless communication device uses the inherent functionality of the reverse link, including an audio input device (120) to determine whether the wireless communication device is operating in a high noise environment. A signal analyzer (124) analyzes the audio signal on the reverse link and determines whether the ambient noise level exceeds predetermined threshold. If so, the signal analyzer (124) activates a filter (126) to filter the audio signal being provided to an audio output transducer (122). Band limiting the audio signal provided to the audio output transducer (122) improves intelligibility of the audio signal in the presence of noise.

12 Claims, 4 Drawing Sheets

SYSTEM AND METHOD FOR ADAPTIVE EQUALIZATION IN A WIRELESS COMMUNICATION SYSTEM

FIELD OF THE INVENTION

The present invention relates generally to wireless communication systems and, more particularly, to a system and method for adaptive equalization in a communication link in a wireless communication system.

BACKGROUND OF THE INVENTION

Wireless communication devices, such as cellular telephones, are widely used as a replacement for conventional telephone systems. One advantage of the wireless communication devices is their portability. The user can operate the wireless communication device from virtually any point on earth.

One common use of wireless communication devices is in the automobile. However, the ambient noise level in an automobile can make satisfactory operation of the wireless communication device difficult or impossible. Similarly, operation in other high noise environments, such as a factory or in a crowd (e.g., at a baseball game) can also make satisfactory operation difficult or impossible.

FIG. 1 provides an illustration of a wireless communication system 2 that comprises a mobile unit 4 and one or more base station transceiver systems (BTS) 6. For the sake of simplicity, only one BTS 6 is illustrated in FIG. 1. The BTS 6 is coupled to a cell tower 8 and establishes a communication link 10 with the mobile unit 4.

As those skilled in the art can appreciate, the communication link 10 is illustrative of multiple forms of communication that occur between the mobile unit 4 and the BTS 6. For example, typical communication between the mobile unit 4 and the BTS 6 are in the form of audio communications. However, the communication link 10 is initially set up using other forms of communication that occur over a control channel. These specific steps used to establish the communication link 10 between the mobile unit 4 and the BTS 6 are known in the art and need not be described in any detail herein. Furthermore, the specific steps used to establish the communication link 10 may vary from one type of wireless system to another. For example, analog cellular communications may have one protocol used to establish the communication link 10 while digital communication devices, such as a CDMA wireless system, may have an entirely different protocol used to establish the communication link. However, the steps required by any system to establish the communication link are well known and need not be described herein.

The data transmitted from the BTS 6 to the mobile unit 4 is sometimes referred to as a forward communication link 12 while the data transmitted from the mobile unit to the BTS is referred to as a reverse communication link 14.

In a high noise environment, an audio signal transmitted on the forward link 12 can be difficult for the user to hear. Accordingly, there is a significant need for a system and method that processes the audio data received on the forward link 12 in a manner that improves intelligibility. The present invention provides this and other advantages that will be apparent from the following detailed description and accompanying figures.

SUMMARY OF THE INVENTION

The present invention is embodied in a system and method for adaptive equalization in a wireless communication system. In one embodiment, the wireless communication device transmits data to and receives data from a remote location and comprises a signal analyzer to analyze data to be transmitted to the remote location and to determine therefrom a noise characteristic present at a location of the mobile unit. The signal analyzer generates signals indicative of the noise characteristic. An equalizer is selectively activated by the generated signals to alter spectral characteristics of data received from the remote location in response to the generated signals.

In one embodiment, the signal analyzer may periodically analyze the data to be transmitted to the remote location and generate periodic signals indicative of the noise characteristic. The equalizer is an adaptive equalizer and periodically alters the spectral characteristics of the received data in response to the signals periodically generated by the signal analyzer. In one embodiment, the equalizer may be a high pass filter. The frequency response characteristic of the high pass filter may be adjusted to correspond to a frequency response characteristic of the output transducer. In some wireless devices, a plurality of different output devices may be coupled to the wireless communication device. Each external device has its own frequency response characteristic. The frequency response characteristic of the equalizer may be selected to correspond to the frequency response characteristic of the selected output transducer.

DETAILED DESCRIPTION OF THE PREFERRED EMBODIMENTS

The present invention analyzes audio data on the reverse link 14 (see FIG. 1) and uses the results of the analysis to modify audio data on the forward link 12. Based on the analysis, the audio base band data on the forward link 12 may be filtered to provide the user with a more intelligible audio signal. This is particularly useful in a high ambient noise environment.

The present invention analyzes audio data and thus may be readily implemented on any wireless communication device. A short explanation of the use of audio data on the forward link 12 (see FIG. 1) and the reverse link 14 may assist in a better understanding of the present invention. Briefly, the forward link 12 comprises audio data modulated with a radio frequency (RF) carrier using one of a number of different known modulation techniques, such as amplitude modulation (AM), frequency modulation (FM), or the like. The present invention is not limited by the form of RF modulation. In addition, the present invention may be readily applied to various forms of wireless communication, such as an analog or digital cellular telephone, a personal communication system (PCS) device or the like. Furthermore, known telecommunication technologies, such as time division multiple access (TDMA), frequency division multiple access (FDMA), and code division multiple access (CDMA) may be satisfactorily used with the present invention. The present invention is not limited by the specific implementation of the communication link 10 for either the forward link 12 or the reverse link 14.

Although the system is described with respect to the analysis of audio data, the essential analysis described below may be performed at other stages of data processing. For example, the analysis could be performed after the audio data on the reverse link 14 has been modulated. Thus, the present invention is not limited solely to analysis of base band audio data.

Figure 2:
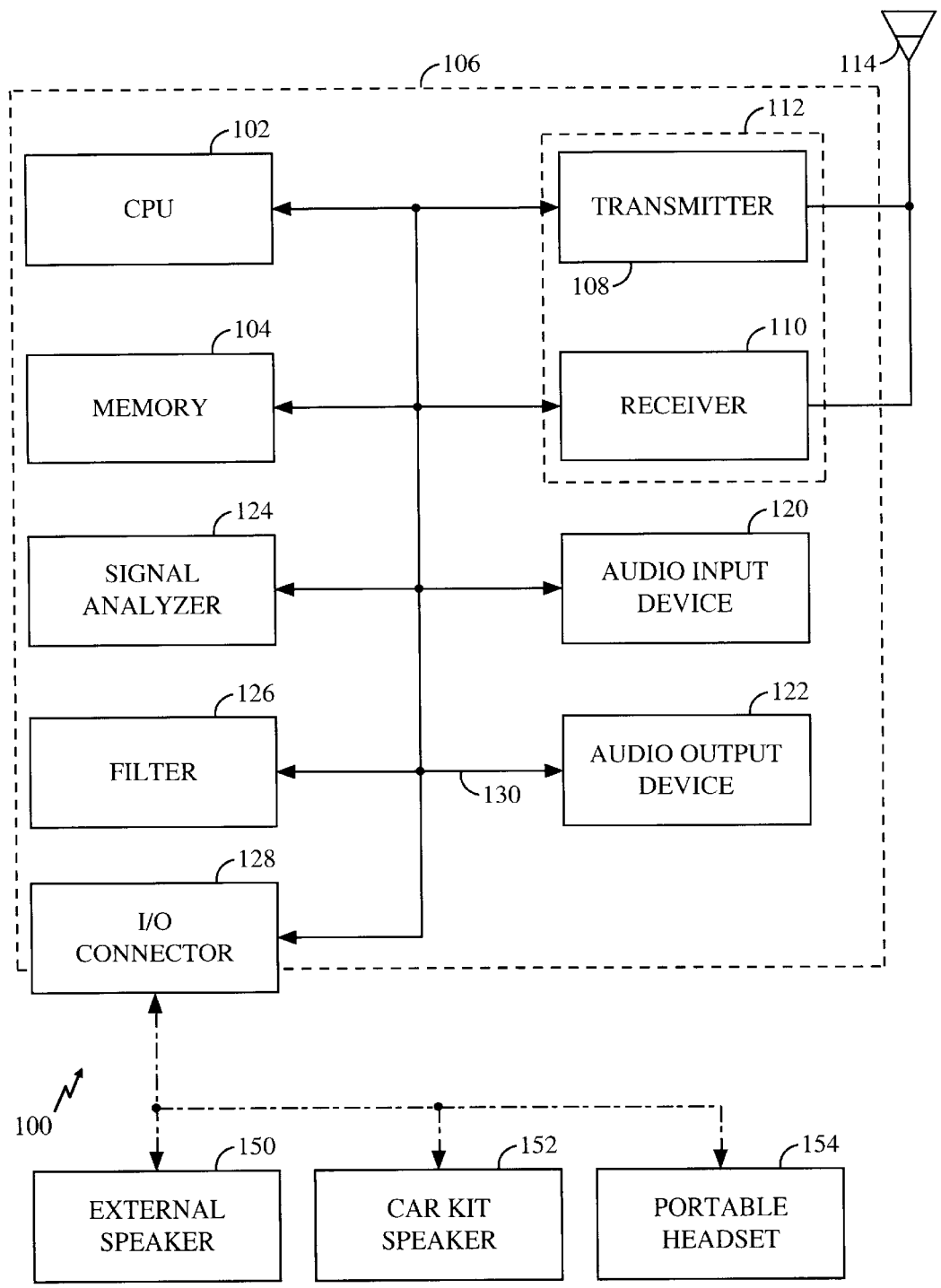
FIG. 2 is a functional block diagram of a system implementing the present invention.

The present invention is embodied in a system 100 illustrated in the functional block diagram of FIG. 2. The system 100 includes a central processing unit (CPU) 102, which controls operation of the system. Those skilled in the art will appreciate that the CPU 102 is intended to encompass any processing device capable of operating the telecommunication system. This includes microprocessors, embedded controllers, application specific integrated circuits (ASICs), digital signal processors (DSPs), state machines, dedicated discrete hardware, and the like. The present invention is not limited by the specific hardware component selected to implement the CPU 102.

The system also preferably includes a memory 104, which may include both read-only memory (ROM) and random access memory (RAM). The memory 104 provides instructions and data to the CPU 102. A portion of the memory 104 may also include non-volatile random access memory (NVRAM), such as flash RAM.

The system 100, which is typically embodied in a wireless communication device such as the mobile unit 4 (see FIG. 1), also includes a housing 106 that contains a transmitter 108 and a receiver 110 to allow transmission and reception of data, such as audio communications, between the system 100 and a remote location, such as the BTS 6. The transmitter 108 and receiver 110 may be combined into a transceiver 112. An antenna 114 is attached to the housing 106 and electrically coupled to the transceiver 112. The operation of the transmitter 108, receiver 110, and antenna 114 is well known in the art and need not be described herein except as it relates specifically to the present invention.

The system 100 also includes an audio input device 120, such as a microphone, and an audio output device 122, such as a speaker. The audio input device 120 and audio output device 122 are generally mounted in the housing 106. Additional components may also be used in a conventional manner depending on the type of wireless communication device. For example, an analog cellular telephone does not require the digitization of any audio data. In contrast, a digital wireless communication device will require additional components to convert analog audio data to digital form. Although not specifically illustrated in FIG. 2, the audio input device 120 is coupled to an analog-to-digital converter (ADC) which converts analog audio signals to digital form if the system 100 is implemented in a digital wireless communication device. The ADC may be a portion of a voice encoding system, generically referred to as a VOCODER, which encodes the audio data in a known fashion. Similarly, the audio output device 122 is coupled to a digital-to-analog converter (DAC) which converts digital audio data to analog form. For the sake of clarity, the ADC and DAC are not shown in the functional block diagram of FIG. 2. However, the operation of the ADC and DAC (not shown) is well known in the art and need not be described herein. As noted above, the present invention does not require the inclusion of these components. The audio device 122, which is sometimes referred to as a receiver (not to be confused with the receiver 110), may be replaced by an external device 150, 152, 154 (see FIG. 2), as will be described in greater detail below.

Figure 1:
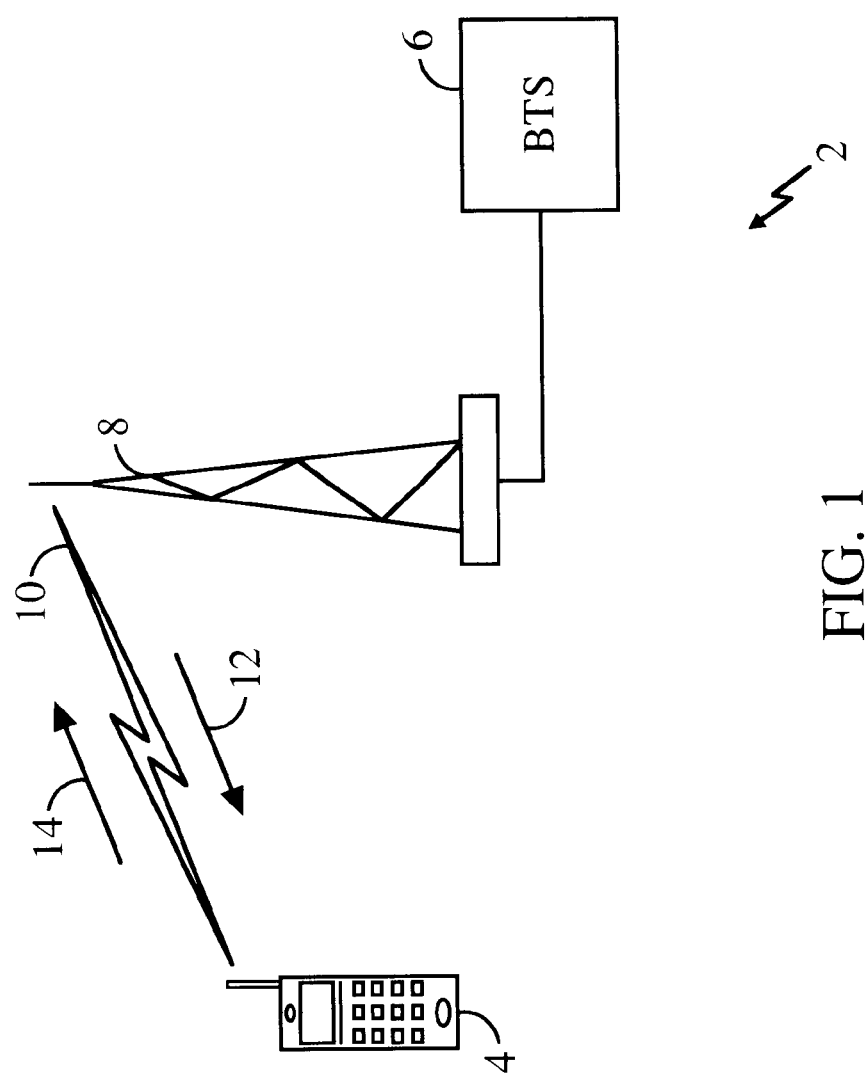
FIG. 1 illustrates an exemplary communication link between a mobile unit and a base station transceiver system (BTS).

The system 100 also includes a signal analyzer 124 to analyze the audio data being sent to the transmitter 108 for transmission on the reverse link 14 (see FIG. 1). As will be described in greater detail below, the signal analyzer 124 determines whether the audio data on the reverse link 14 has a signal level that surpasses a predetermined threshold, thus indicating the presence of high levels of ambient noise that are detected by the audio input device 120.

The system 100 further comprises a filter 126 that operates in conjunction with the signal analyzer 124 to band limit the audio data received on the forward link 12 (see FIG. 1). As will be discussed in greater detail below, the signal analyzer 124 determines when ambient noise levels are above a predetermined threshold and activates the filter 126 when the ambient noise level is sufficiently high. The filter 126 filters the audio data received on the forward link 12 such that the audio output device 122 is band limited in the presence of high ambient noise levels.

In an exemplary embodiment, the system 100 may be coupled to external audio devices via an input-output (I/O) connector 128). The I/O connector 128 provides a port for audio input and output and may further provide access to control signals and other operational components, such as a keyboard (not shown).

The various components of the system 100 are coupled together by a bus system 130, which may include a power bus, a control signal bus, and a status signal bus in addition to a data bus. However, for the sake of clarity the various buses are illustrated in FIG. 2 as the bus system 130.

One skilled in the art will appreciate that the system 100 illustrated in FIG. 2 is a functional block diagram rather than a listing of specific components. For example, although the signal analyzer 124 and filter 126 are illustrated as two separate blocks within the system 100, they may be in fact embodied in one physical component, such as a digital signal processor (DSP). They may also reside as program codes in the memory 104, such code being operated on by the CPU 102. The same considerations may apply to other components listed in the system 100 of FIG. 2.

As noted above, the audio output device 122 may be replaced by an external device, such as an external speaker 150, a car kit speaker 152, a portable headset 154, or the like. The system 100 can use conventional technology to automatically identify which type of device is coupled to the I/O connector 128. For example, the system 100 automatically detects when the I/O connector 128 is coupled to the car kit speaker 152 and may further adjust parameters, such as volume level, to accommodate connection to the car kit speaker. Alternatively, if the system 100 determines that the portable headset 154 is coupled to the I/O connector 128, a different set of parameters, such as volume level, may be utilized for proper operation of the system with the portable headset. As will be described in greater detail below, the characteristics of the filter 126 may also be adjusted to operate most effectively with the particular audio device. That is, one set of filter characteristics may be applied when the audio output device 122 is used, while other filter characteristics may be applied if an external device, such as the car kit speaker 152 or portable headset 154 is coupled to the I/O connector 128.

It has been determined that the intelligibility of audio signal generated by the audio output device 122 (or external devices 150–154) is adversely affected by the presence of ambient noise. For example, operation of the mobile unit in an automobile may be marginally affected if the automobile is not in motion. However, if the automobile is in motion and/or the windows are down, the higher level of ambient noise may cause problems with the car kit speaker 152. In the presence of such high levels of ambient noise, it is desirable to limit the bandwidth of the audio data received by the receiver 110 that will be sent to the audio output device 122.

In one embodiment, the signal analyzer 124 merely analyzes the overall signal strength and provides an indicator when the signal strength of the audio base band data on the reverse link 14 exceeds a predetermined threshold. Alternatively, the signal analyzer 124 may additionally perform spectral analysis to determine the frequency component(s) that contribute to the high ambient noise level detected by the audio input device 120. In an exemplary embodiment of the invention, the signal analyzer 124 determines the level of ambient noise and activates the filter 126 if the ambient noise rises above a predetermined threshold. Although it is possible to have a separate audio input system to measure the level of ambient noise, the system 100 takes advantage of the audio signal processing capability already present in the mobile unit 4 that is required to transmit audio data on the reverse link 14 (see FIG. 1). As previously noted, components of the system 100 used in data processing on the reverse link 14 comprise the audio input device 120 (and associated ADC) and the transmitter 108. However, the signal analyzer 124 need only analyze audio base band data before it is processed by the transmitter 108.

The system components typically associated with signal processing of data on the forward link 12 (see FIG. 1) are the receiver 110 and the audio output device 122. Proper understanding of the present invention does not require detailed description of the operation of the receiver 110. In a digital implementation of the system 100, the receiver 110 detects and decodes the RF signal to produce a digital audio base band signal. Other well known forms of data processing for error detection/correction and the like may also be performed in a conventional manner. Ultimately, the data received on the forward link 12 is processed to produce digital audio data that is sent to the audio output device 122 via the DAC (not shown).

In contrast, components typically involved in signal processing on the reverse link 14 comprise the audio input device 120 and the transmitter 108. Audio signals, such as speech signals, are detected by the audio input device 120 and converted to digital form by the ADC (not shown). The digital audio data is ultimately modulated by the transmitter to generate an RF signal that is transmitted from the mobile unit 4 to the BTS 6 via the reverse link 14. Again, the processing required to generate the RF signal on the reverse link is known in the art and is not required for proper understanding of the present invention. As will be discussed in greater detail below, the system 100 analyzes the digital audio data that will be transmitted on the reverse link to determine an ambient noise level. Based on the ambient noise level, the system 100 may filter the audio base band data received on the forward link 12 so as to band limit the signal sent to the audio output device 122.

In some wireless communication devices, the mobile unit 4 is capable of detecting noise in the environment and controlling the power level of the base band audio. For example, the CPU 102 may analyze the signal to noise (S:N) ratio and adjust the power level of the signal delivered to the audio output device 122 based on the S:N ratio. In this example, the power level of the audio signal would be increased if the S:N ratio decreases. Conversely, if the ambient noise level decreases, the CPU 102 detects an increase in the S:N ratio and may decrease the power level to the audio output device 122 accordingly. In other wireless communication devices, the CPU 102 may perform a similar function in the form of an audio automatic gain control (AGC) circuit. The CPU 102 or the signal analyzer 124 may detect noise in the environment and control the power level of the signal to the audio output device 122 as part of an AGC loop. AGC gain control is known in the art, and need not be described in greater detail herein.

In normal operation (i.e., a low noise environment), the bandwidth of the audio signal is determined by the frequency response of the output device (e.g., the audio device 122 or one of the external audio devices 150–154) as well as bandwidth limitations set by the system design criteria. However, the filter 126 alters the response of the system if activated by the signal analyzer 124 in the presence of high levels of ambient noise.

Figure 3:
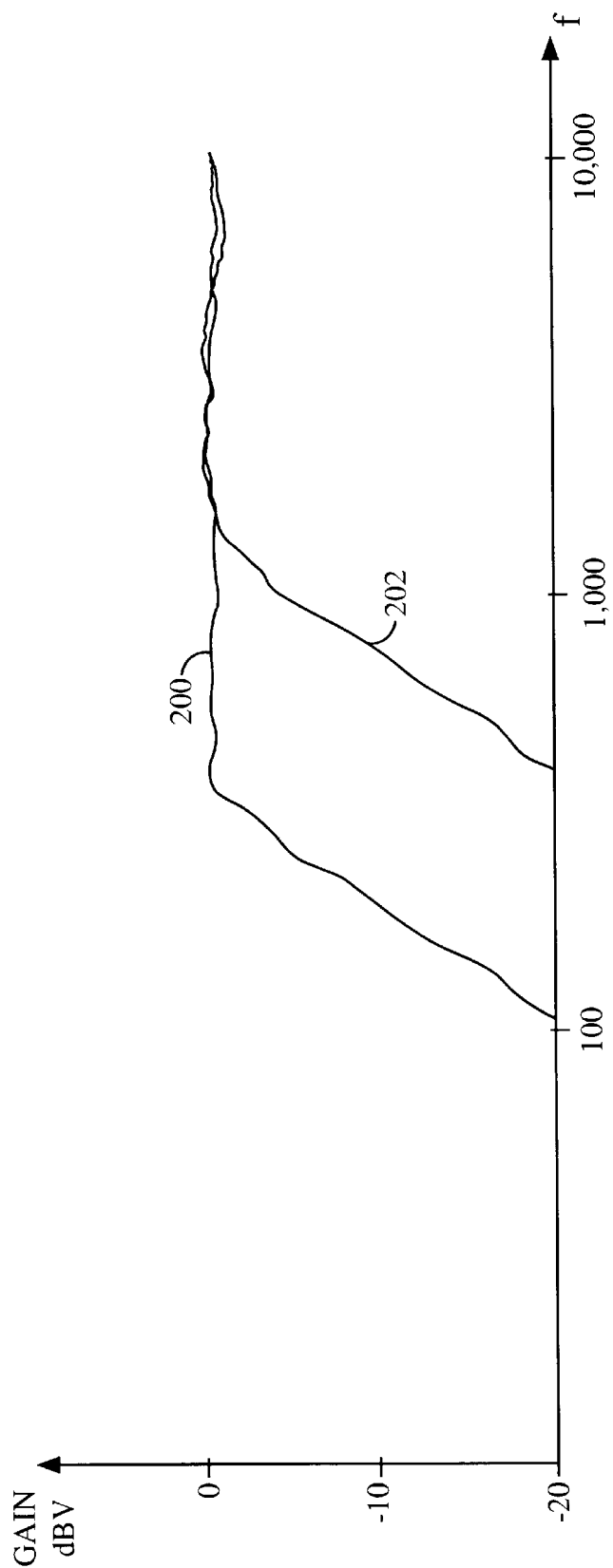
FIG. 3 is a frequency response plot implemented in an exemplary embodiment of the present invention.

As noted above, the system 100 automatically detects when an external device, such as the car kit speaker 152 (see FIG. 2) or portable headset 154, is coupled to the I/O connector 128. Each device typically has its own characteristic resonant frequency. The filter 126 may be implemented as a high pass filter whose cutoff frequency may be adjusted to be slightly higher than the resonance of the selected output transducer. For example, the audio output device 122 typically has a resonance at approximately 300 Hz–400 Hz. When the system 100 is implemented using the audio output device 122, the cutoff frequency of the filter 126 may be readily set at 500 Hz, as illustrated by a response curve 200 in FIG. 3. In another example, the car kit speaker 152 may have a resonant frequency of approximately 800 Hz. If the car kit speaker 152 is coupled to the I/O connector 128, the mobile unit 4 automatically detects the presence of the car kit speaker and can adjust the cutoff frequency of the filter 126 to be 1,000 Hz, as illustrated by a response curve 202. Other cutoff frequencies for the filter 126 may be selected based on the resonance of the external speaker 150 and the portable headset 154, respectively. In this manner, the filter 126 is activated in the presence of high levels of ambient noise and reduces power delivered to the output transducer (e.g., the audio output device 122) so as to reduce the power delivered to the output transducer in the frequency range where excess signal power decreases intelligibility of the audio signal. Excess signal power at or below the resonance of the output transducer can result in significant audible distortion which can impair intelligibility.

In an exemplary embodiment, the CPU 102 and signal analyzer 124 are portions of a single DSP. The filter 126 is also readily implemented by the DSP. In one embodiment, the filter 126 is implemented as a third order high pass filter whose cutoff frequency is slightly higher than the resonance of the output transducer (e.g., the audio output device 122). A third order high pass filter may be conveniently implemented by the DSP and can be customized with different cutoff frequencies. Those skilled in the art will recognize that other filter types may be used to implement the filter 126. For example, the signal analyzer 124 may perform a spectral analysis and the filter 126 may be implemented as a band pass filter or a notch filter to eliminate unwanted noise signals detected by the signal analyzer. Alternatively, the high pass filter illustrated in FIG. 3 may be implemented as a lower or higher order filter. The present invention is not limited by the specific embodiment of the filter 126.

A reduction in power delivered to the output transducer (e.g., the audio output device 122) may reduce power consumption in the mobile unit 4 (see FIG. 1) by reducing the overall power delivered to the output transducer. In addition, the filter 126 serves to reduce the physical damage to the output transducer (e.g., the audio output device 122) that may occur if an automatic gain control system is used in a high noise environment. That is, the AGC system would typically increase the power delivered to the output transducer (e.g., the audio output device 122) in a high noise environment. Such high power levels may damage or reduce the life of the output transducer. By band limiting the power delivered to the output transducer, the system 100 reduces wear and tear on the output transducer and may lengthen its operational lifetime.

If used with an AGC system, the band limiting effects of the filter 126 may allow the AGC circuit to deliver more power to the output transducer (e.g., the audio output device 122) at useful frequencies. That is, frequencies at or below the resonant frequency of the output transducer are greatly reduced thus improving intelligibility. The overall power to the output transducer may be subsequently increased such that more energy is delivered at useful frequencies (i.e., above the cutoff frequency of the filter 126) thus further improving intelligibility in a high noise environment.

Figure 4:
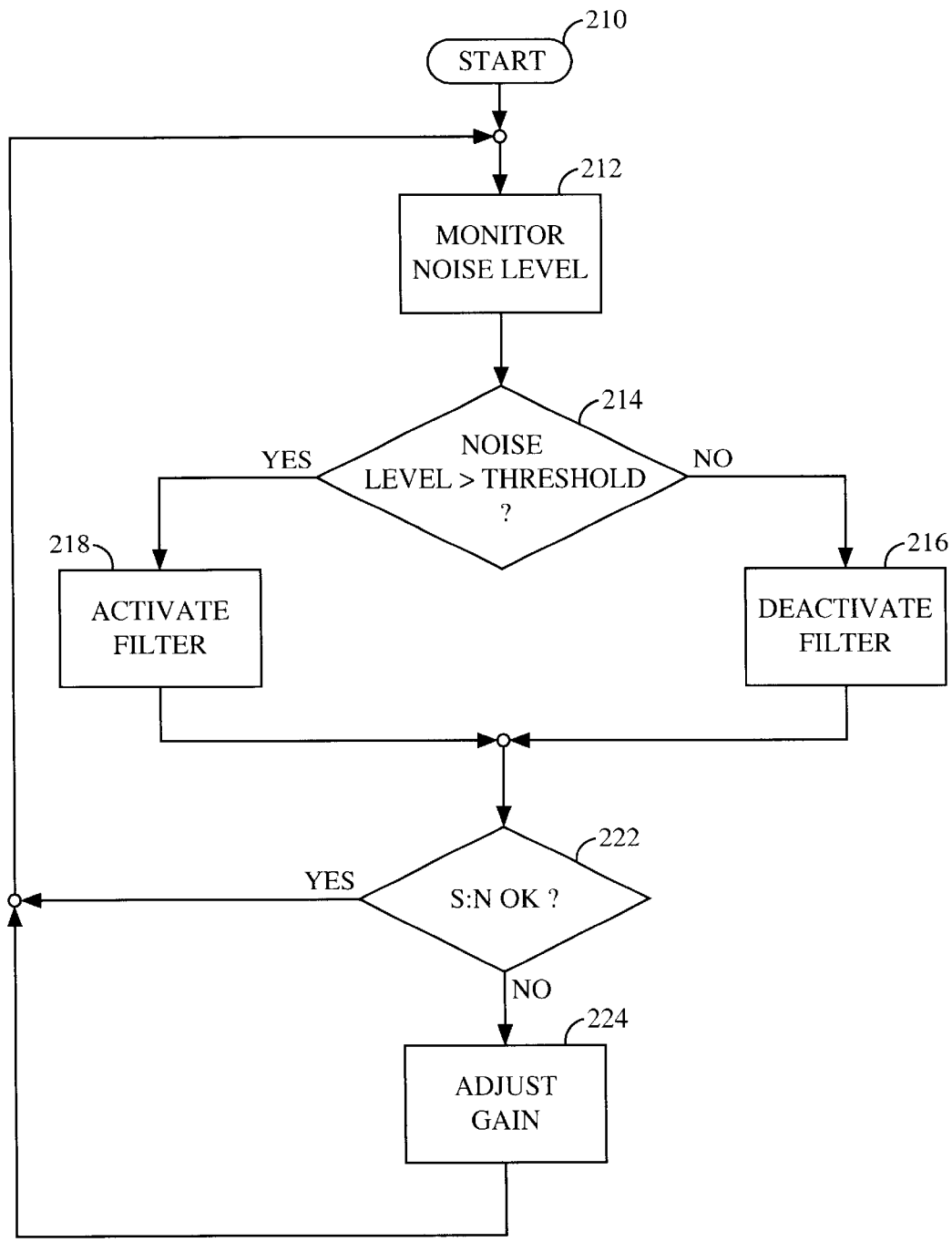
FIG. 4 is a flowchart illustrating the operation of the present invention.

The operation of the system 100 is illustrated in the flowchart of FIG. 4 where at a start, 210, the system 100 is under power. In step 212, the signal analyzer 124 monitors the ambient noise level. As noted above, the signal analyzer 124 takes advantage of the audio input processing elements, such as the audio input device 120, ADC (not shown) and/or the VOCODER (not shown). In decision 214, the system 100 determines whether the ambient noise level exceeds a predetermined threshold. If the ambient noise level is not above the predetermined threshold, the result of decision 214 is NO and in step 216, the system 100 deactivates the filter 126.

If the ambient noise level is above the predetermined threshold, the result of decision 214 is YES and in step 218, the system 100 activates the filter 126. Following the deactivation or activation of the filter 126 in steps 216 and 218, respectively, the system 100 moves to decision 222 to determine if the signal level provided to the output transducer (e.g., the audio output device 122) is satisfactory. It should be noted that this is an optional step that may be implemented if the mobile unit 4 (see FIG. 1) is equipped with an AGC system. Assuming the mobile unit is equipped with an AGC system, the AGC system determines in step 222 whether the signal to noise ratio is satisfactory. If the signal to noise ratio is unsatisfactory, the result of decision 222 is NO and in step 224, the system 100 adjusts the gain of the signal provided to the output transducer (e.g., the audio output device 122). If the signal to noise ratio is satisfactory, the result of decision 222 is YES. In that event, or following the adjustment of the gain in step 224, the system returns to step 212 and continues to monitor the ambient noise level. Thus, the system 100 continuously analyzes ambient noise level using circuit components from the reverse link 14 (see FIG. 1) and based on analysis of the audio signal in the reverse link, may filter the audio signal on the forward link to make the audio signal more intelligible to the user in a high noise environment.

It is to be understood that even though various embodiments and advantages of the present invention have been set forth in the foregoing description, the above disclosure is illustrative only, and changes may be made in detail yet remain within the broad principles of the invention. Therefore, the present invention is to be limited only by the claims.

What is claimed is:

1. A system for adaptive equalization in a wireless communication system having a base station including a base station transmitter and a base station receiver, the base station transmitter transmitting audio data on a forward communication link, the base station receiver receiving audio data on a reverse communication link, the system comprising:

a mobile unit having a transmitter and a receiver to communicate with the base station the reverse and forward communication links, respectively;

a signal analyzer to analyze audio data to be transmitted on the reverse communication link and thereby determine a noise characteristic present at a location of the mobile unit, the signal analyzer generating signals indicative of the noise characteristic; and a filter to filter spectral characteristics of the audio data received from the base station transmitter, the alter receiving the signals generated by the signal analyzer and altering the spectral characteristics of the audio data in response thereto, wherein the filter is a high-pass filter.

2. The system of claim 1, further comprising an output transducer, having a frequency response characteristic, to generate audible signals representative of the data received from the base station transmitter, a filter response characteristic being selected based on the frequency response characteristic of the output transducer.

3. The system of claim 1, further comprising a plurality of output transducers, each having a frequency response characteristic, one of which is selected generate audible signals representative of the data received from the base station transmitter, the filter response characteristic being adjustable and being selected based on the frequency response characteristic of the selected output transducer.

4. A system for adaptive equalization in a wireless communication device that transmits data to and receives data from a remote location, the system comprising:

a signal analyzer to analyze data to be transmitted to the remote location and determine therefrom a noise characteristic present at a location of the mobile unit, the signal analyzer generating signals indicative of the noise characteristic; and an equalizer selectively activated by the generated signals to alter spectral characteristics of data received from the remote location in response thereto, wherein the equalizer comprises a high-pass filter.

5. The system of claim 4 wherein the signal analyzer periodically analyzes the data to be transmitted to the remote location and generates the signals indicative of the noise characteristic, the equalizer being an adaptive equalizer and periodically altering the spectral characteristics of the received data in response the signals periodically generated by the signal analyzer.

6. The system of claim 4, further comprising an output transducer, having a frequency response characteristic, to generate audible signals representative of the data received from the remote location, a high-pass filter response characteristic being selected based on the frequency response characteristic of the output transducer.

7. The system of claim 4, further comprising a plurality of output transducers, each having a frequency response characteristic, one of which is selected to generate audible signals representative of the data received from the remote location, the high-pass filter response characteristic being adjustable and being selected based on the frequency response characteristic of the selected output transducer.

8. A method for adaptive equalization in a wireless communication device transmits data to and receives data from a remote location, the method comprising:

analyzing data to be transmitted to the remote location and determining therefrom a noise characteristic present at a location of the mobile unit;

generating signals indicative of the noise characteristic; and altering spectral characteristics of data received from the remote location in response to the generation of signals indicative of the noise characteristic, wherein a high-pass filter performs altering spectral characteristics of the data received from the remote location.

9. The method of claim 8 wherein the data to be transmitted to the remote location is periodically analyzed and the signals indicative of the noise characteristic periodically generated, the spectral characteristics of the received data being periodically altered in response the periodically generated signals indicative of the noise characteristic.

10. The method of claim 8 wherein altering spectral characteristics of the data received from the remote location comprises high-pass filtering of the data received from the remote location.

11. The method of claim 10 wherein the wireless communication device comprises an output transducer, having a frequency response characteristic, to generate audible signals representative of the data received from the remote location, the method further comprising selecting a high-pass filter response characteristic based on the frequency response characteristic of the output transducer.

12. The method of claim 10 wherein the wireless communication device comprises a plurality of output transducers, each having a frequency response characteristic, one of which is selected to generate audible signals representative of the data received from the remote location, the method further comprising altering spectral characteristics of data received from the remote location based on the frequency response characteristic of the selected output transducer.

* * * * *